United States Patent [19]
Strickler

[11] Patent Number: 6,028,766
[45] Date of Patent: Feb. 22, 2000

[54] STRATEGICALLY PLACED COMPLIANCE BUMPS FOR SHOCK ATTENTUATION

[75] Inventor: Mike T. Strickler, Boise, Id.

[73] Assignee: Hewlett-Packard Company, Palo Alto, Calif.

[21] Appl. No.: 08/896,932

[22] Filed: Jul. 18, 1997

[51] Int. Cl.$^7$ .................................................... G06F 1/16
[52] U.S. Cl. .................. 361/685; 360/97.02; 248/638
[58] Field of Search .................. 361/685; 360/97.02; 248/638

[56] References Cited

U.S. PATENT DOCUMENTS

| | | | |
|---|---|---|---|
| 4,705,257 | 11/1987 | Leo et al. | 248/638 |
| 4,871,142 | 10/1989 | DeMay, II | 248/638 |
| 5,004,207 | 4/1991 | Ishikawa et al. | 360/97.02 |
| 5,653,070 | 8/1997 | Seguin | 248/638 |
| 5,673,171 | 9/1997 | Varghese et al. | 361/685 |
| 5,687,059 | 11/1997 | Hoppal | 361/685 |

*Primary Examiner*—Leo P. Picard
*Assistant Examiner*—John D. Reed
*Attorney, Agent, or Firm*—Lane R. Simmons

[57] ABSTRACT

An enclosure for holding shock sensitive mechanisms (such as disk drives) includes compliance members strategically located on a bottom support member for substantially reducing a shock pulse amplitude component transmitted into wall structures of the enclosure and consequently into the shock sensitive mechanisms. The compliance members are positioned so as to contact a support surface upon which the enclosure is set or rests. In a preferred embodiment, the compliance members are positioned on the bottom support member generally away from and/or generally equidistant from any two nearest wall structures, and generally away from any bottom support member portion that is stiffly coupled to the wall structures. As such, the shock pulse acceleration force amplitude component is reduced significantly prior to being transmitted to the wall structures in the event of a typical tilt drop of the enclosure. Also, preferably, the compliance members are molded into or formed onto the bottom support member as part of the bottom support member to provide shock amplitude attenuation to the enclosure at essentially no additional cost and with no additional parts.

5 Claims, 8 Drawing Sheets

STRATEGICALLY PLACED COMPLIANCE BUMPS FOR SHOCK ATTENTUATION

FIELD OF THE INVENTION

This invention relates in general to shock protection of frequency sensitive mechanisms and, more particularly, to shock protection of multiple disk mechanisms in an enclosure module during movement and tilt dropping of the enclosure module.

BACKGROUND OF THE INVENTION

For many products, susceptibility to shock damage is not merely determined by the amount of energy in the shock, but also the frequency content of that shock. These are typically products in which the internal resonances play a significant role in damaging the product. For example, disk drive mechanisms are highly susceptible to shock damage. In fact, one of the many failure modes in a disk drive is disk media surface damage due to the arm tip striking the disk surface, leading to possible loss of data and/or a catastrophic head crash. Since disk drives are very tightly built, actuator arm tips are nominally only about 0.008 inches above the disk surface, and are commonly even much closer due to manufacturing tolerances. As such, a shock pulse with a frequency content that matches the arm resonance, for instance, will cause higher displacements of the arm tips than a shock pulse of lower frequency (total energy being equal). To this regard, the fundamental frequency content of a shock pulse can be estimated by taking the inverse of the pulse duration doubled. A doubling of duration will drop the fundamental frequency content in half.

These shock pulses may be especially damaging in connection with enclosures or modules that house multiple disk drive mechanisms. Often multiple drive mechanisms are housed in a single enclosure to implement modular disk array architectures and data redundancy schemes such as those known in redundant arrays of inexpensive disks (RAID) configurations. Enclosures that house multiple disk drives are especially subject to shock pulses (or shock waves) as they are loaded and unloaded in transit from manufacturer to retailer to customer, and during normal placement (i.e., lifting, dropping or tilt dropping) into position for use by the customer, because of the generally bulky size and extra weight associated with the enclosure due to the multiple mechanisms therein. As such, damage may occur not only to one but to several potentially costly mechanisms in the form of media damage, spindle damage, etc.

Accordingly, an object of the present invention is to provide improved shock protection for shock sensitive mechanisms and, especially, for arrays of such mechanisms that are housed in a single enclosure. Further objects are to provide shock protection at essentially no additional cost and with no additional parts to the enclosure.

SUMMARY OF THE INVENTION

According to principles of the present invention in a preferred embodiment, an enclosure for holding shock sensitive mechanisms (such as disk drives) includes compliance bumps strategically located on a bottom support member for substantially reducing the amplitude of, and typically increasing the duration of a shock pulse transmitted into wall structures of the enclosure and consequently into the shock sensitive mechanisms. As the enclosure is set down upon any flat support surface, the compliance bumps make contact with the support surface.

In a preferred embodiment, the compliance bumps are located on the bottom support member at a position generally away from any wall structures and any bottom support member portions that are stiffly coupled to the wall structures. For example, the compliance bumps are located generally equidistant from any two nearest wall structures. As such, shock pulses to the wall structures and shock sensitive mechanisms are generally reduced in amplitude by at least about one-third in the event of a typical tilt drop of the enclosure.

According to further principles, the compliance bumps are molded into the bottom support member (in the event of a plastic enclosure) or formed onto the bottom support member (in the event of a sheet metal enclosure) as part of the bottom member to provide shock protection at virtually no additional cost and with no additional parts to the enclosure.

Other objects, advantages, and capabilities of the present invention will become more apparent as the description proceeds.

DETAILED DESCRIPTION OF THE INVENTION

Figure 1:
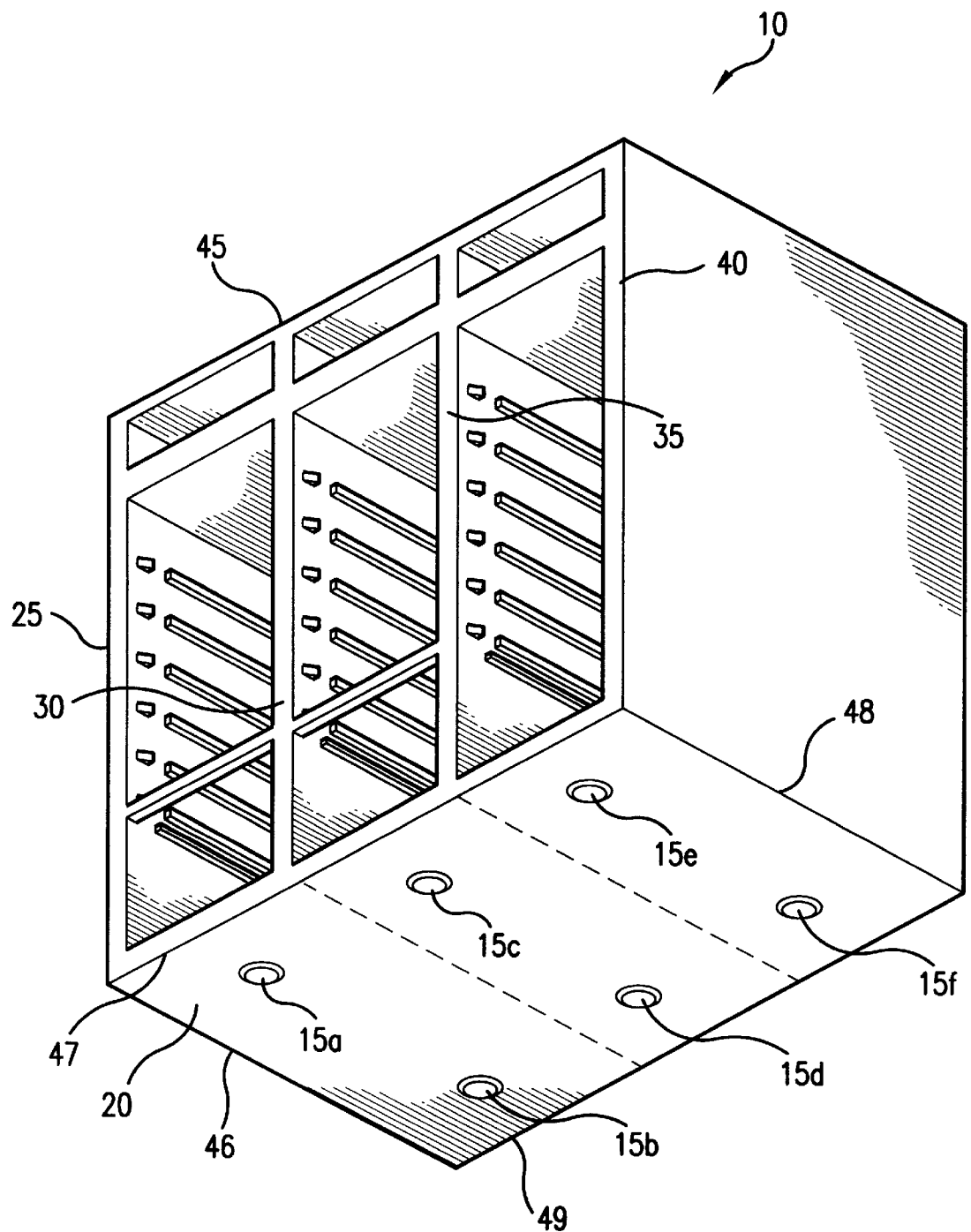
FIG. 1 is a bottom perspective view of an enclosure configured for holding shock sensitive mechanisms and having thereon strategically placed compliance bumps of the present invention.

FIG. 1 is a bottom perspective view of an enclosure 10 for holding shock sensitive mechanisms and having compliance members 15 of the present invention. Enclosure 10 (which may also be referred to as a housing, module, frame structure, or the like) includes base support 20, walls 25, 30, 35, and 40, and top cover 45. The walls are attached to base support 20 and top cover 45. Each pair of walls 25/30, 30/35, and 35/40 are configured for supporting multiple shock sensitive mechanisms therein (or therebetween) such as disk drives, and/or other electro/mechanical units, such as disk controller boards, power supplies, display panels or the like. Although four walls (three vertical bays) are depicted, the number of walls could be more or less, depending on design configuration for housing the shock sensitive mechanisms and/or other components.

Figure 2:
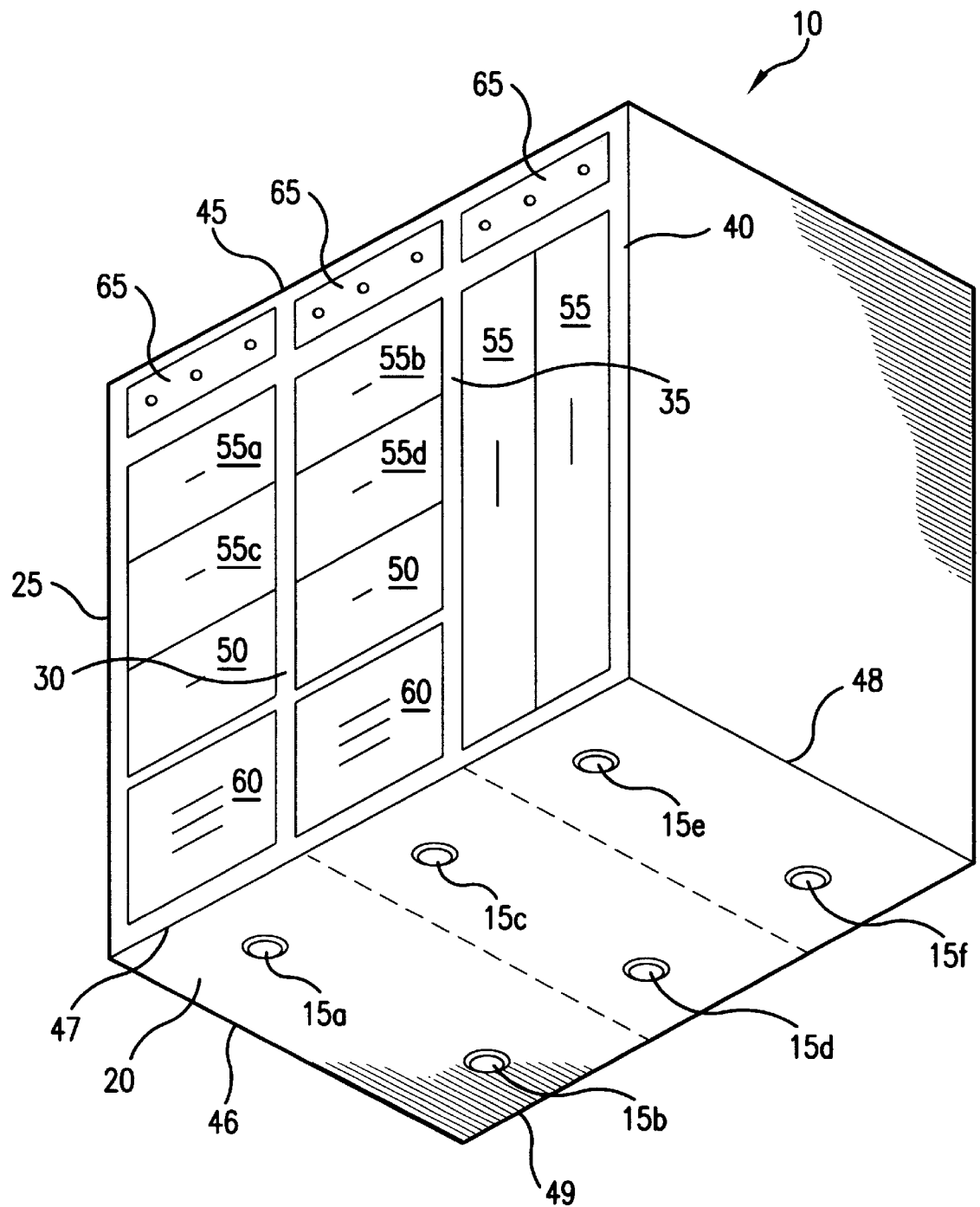
FIG. 2 is a bottom perspective view of the enclosure and compliance bumps, and also including shock sensitive disk drives in the enclosure.

FIG. 2 shows enclosure 10 having multiple shock sensitive disk drive units 50 held between walls 25/30 and 30/35, disk controller boards 55 inserted between walls 35/40, and also power supplies 60 and fan modules 65 within the enclosure. This exemplary configuration of disks, controller boards, fan modules and power supplies is known in the art and used, for example, in RAID systems. However, compliance members 15 and their strategic placement provide a significant improvement over known systems for shock protection/attenuation purposes.

Further in reference to FIGS. 1 and 2, the present invention utilizes compliance members 15 to advantageously reduce the acceleration force amplitude of shock pulses passing through walls 25,30,35,40 and subsequently to disk mechanisms 50 as a result of setting down (or "dropping") enclosure 10 during normal movement/placement of the enclosure. Specifically, as enclosure 10 is used and/or moved from one location to another, it is typically lifted and then slightly dropped (or set down) into its new position. Often, a tilt drop occurs, where one edge of the enclosure (such as the front, back or side) is set on a support surface and the other edge is subsequently set down (dropped) to also rest on the support surface. On any of such occasions, when enclosure 10 is dropped into its new position, shock pulses (or waves) are undesirably transmitted through the base, walls and ultimately to the shock sensitive disk mechanisms 50. However, compliance members 15 are strategically placed on base support 20 so that the amplitudes of the shock pulses are significantly reduced in walls 25,30,35,40 and consequently in the disk mechanisms.

In a preferred embodiment, compliance members 15 are located on base support 20 such that they are positioned generally away from any wall structure and any bottom support member component that is stiffly coupled to any wall structure. This positioning minimizes the amplitude of a shock pulse entering the walls of the enclosure 10 by reducing the stiffness of the shock pulse transfer path, and thereby minimizes potential damage to the disk drives. For example, as shown, compliance members 15a and 15b are generally equidistant between walls 25/30 and are generally away from rigid edges 46, 47 and 49 (of base support 20) that are stiffly coupled to the walls. The adjoining of mid-area walls 30 and 35 with base support 20 are shown in dashed lines in order to clearly depict the generally equidistant configuration of the compliance members between the walls. Another two compliance members 15c and 15d are also generally equidistant between walls 30/35, and another two 15e and 15f are generally equidistant between walls 35/40. Moreover, each of these compliance members are also disposed generally away from rigid edges 47, 48 and 49. As such, when enclosure 10 is dropped (or tilt dropped) onto a support surface (not shown), the compliance members take the hit and the resulting shock waves transfer through the compliance members and into base support 20. This results in a substantial amount of the shock pulse being absorbed in compliance members 15 and in base support 20 such that the shock pulse acceleration force amplitude is significantly reduced and the duration is generally increased. In part, the strategically placed compliance members effectuate the reduced shock pulse amplitude and, typically, increased duration, by providing (i) a longer time duration for the enclosure to decelerate (from the drop), (ii) more sway (or bounding) for the enclosure, (iii) a rolling effect to the base support (especially with a sheet metal base), (iv) and general damping.

Although compliance members 15 are, preferably, generally equidistant between any two walls, it is obvious that slight variations in distance will not significantly reduce the desired shock attenuation to be provided. However, the nearer the compliance members are located to any given wall or rigid member stiffly coupled to the wall, the greater the deceleration of the enclosure and walls will occur, the lesser the duration of the shock pulse, and, thus, the greater the amplitude of the pulse that will transfer up through the walls and, potentially detrimentally, to the disk drives. As such, although there is some leeway in placement of the compliance members on base support 20, care must be taken to avoid placement too near any wall or rigid members stiffly attached to the walls. Thus, actual placement of compliance members under the present invention will, of course, depend upon any given enclosure's particular "wall" or shock sensitive mechanism configurations (or, in other words, shock transfer path configurations). To this regard, for example, if enclosure 10 had no walls (or no other support features) for supporting disk drives 50, but rather the disk drives rested directly on base support 20, then compliance members 15 would be located somewhere on the base support not directly below the disk drives or any rigid outer periphery support structure.

Also in a preferred embodiment, compliance members 15 are bumps that are, optionally, formed onto or molded into base support 20 as part of the base itself, depending on whether the base is constructed of sheet metal or plastic respectively. Specifically, if enclosure 10 is of a plastic molded construction, bumps 15 are, preferably, molded into (as part of) base support 20. Alternatively, if enclosure 10 is of a sheet metal construction, bumps 15 are, preferably, formed onto base support 20 by stamping or the like. These configurations are especially desirably because they provide the necessary shock protection (when strategically placed as discussed) at virtually no additional cost and with no additional parts to the enclosure. Furthermore, they provide a constant dynamic performance over temperature changes, whereas conventional rubber shock mounts (or feet or bumps) may soften with temperature increases or harden over time with exposure to extreme temperature conditions. However, other separately attachable components known in the art could likewise be used as compliance bumps under the present invention.

Figure 3:
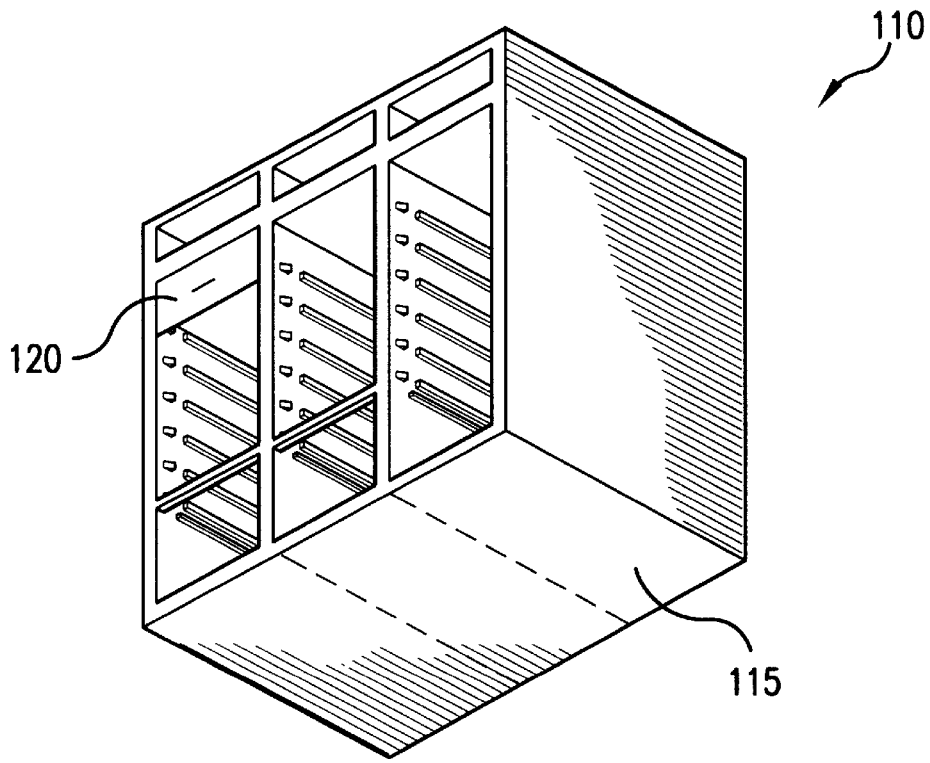
FIG. 3 is a bottom perspective view of an enclosure without compliance bumps (Prior Art).

FIG. 3 is a bottom perspective view of an enclosure 110 without any compliance bumps on base 115 as may be found conventionally in the art. Enclosure 110 includes a single disk drive mechanism 120 mounted therein. FIG. 3 is shown to clearly illustrate the disadvantages of the prior art relative to actual shock pulse amplitude measurements taken.

Figure 4:
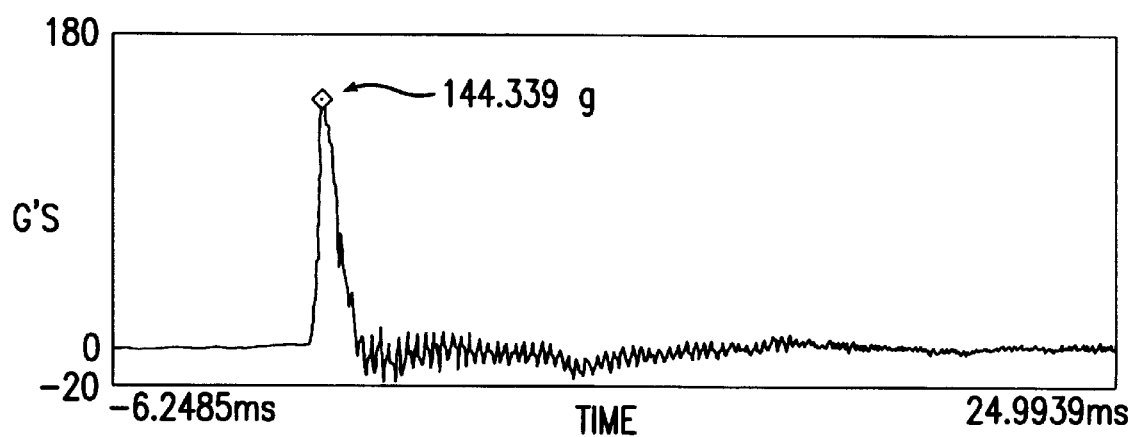
FIG. 4 is a graph showing the G acceleration over time measured at the disk drive in the enclosure of FIG. 3 due to a tilt drop of the enclosure (Prior Art).

Now relative to FIG. 3, the graph of FIG. 4 depicts a shock pulse measurement, showing amplitude and duration, as detected on disk mechanism 120 (of FIG. 3) during an actual tilt drop of enclosure 110. FIG. 4 depicts the shock amplitude and duration that was detected by an accelerometer during a left side tilt drop of the enclosure. The accelerometer (not shown) was attached directly to disk mechanism 120 while the disk was disposed in the upper left bay of the enclosure. For this tilt drop evaluation, the left side of the enclosure (or, in this example, the side of the enclosure in which the disk and accelerometer were disposed) was lifted about 2.5 inches and then dropped. Enclosure 110 was of a sheet metal construction.

As illustrated by FIG. 4, the peak acceleration (G-force) of the tilt drop for enclosure 110 measured about 144 Gs (where 1G=9.81 m/s$^2$) with a fairly short duration of a little over 1 mili-seconds (ms). When this enclosure without compliance bumps experiences a tilt drop, the shock pulse transmits directly up the enclosure's vertical walls, producing a fairly high-G/short-duration pulse. Again, FIG. 3 and FIG. 4 are depicted to form a basis for clearly seeing the benefit of the present invention's strategically placed compliance members.

Figure 5:
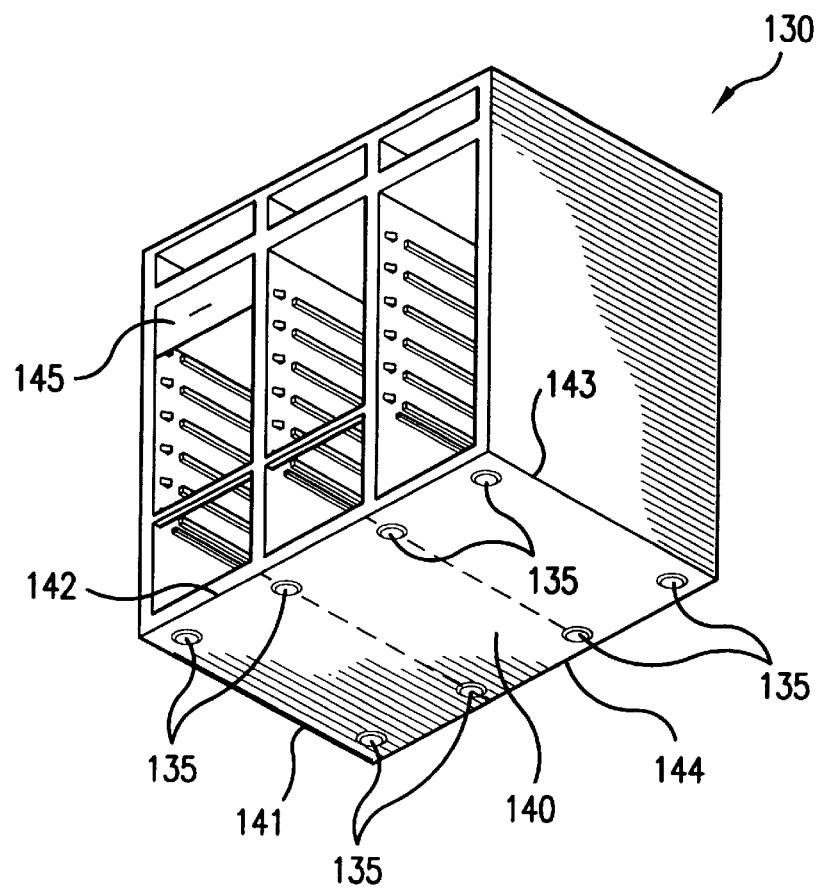
FIG. 5 is a bottom perspective view of an enclosure having compliance bumps that are not strategically disposed thereon (Prior Art).

Comparatively, FIG. 5 is a bottom perspective view of an enclosure 130 having compliance bumps 135 on base 140 as may be found conventionally in the art. Enclosure 130 is the same enclosure as (or very similar to) the enclosure of FIG. 3 (i.e., is also of a metal construction), but is different in that it includes bumps 135. Bumps 135 are disposed on base 140 generally in line with (or underneath) the vertical walls of the enclosure. Bumps 135 are also disposed generally near rigid edges 141, 142, 143 and 144. Enclosure 130 also includes a single disk drive mechanism 145 mounted therein. FIG. 5 is also shown to clearly illustrate the disadvantages of the prior art which uses non-strategically located compliance bumps relative to the strategically located compliance bumps of the present invention (as will be more fully discussed in FIGS. 7–10 and FIGS. 13–14).

Figure 6:
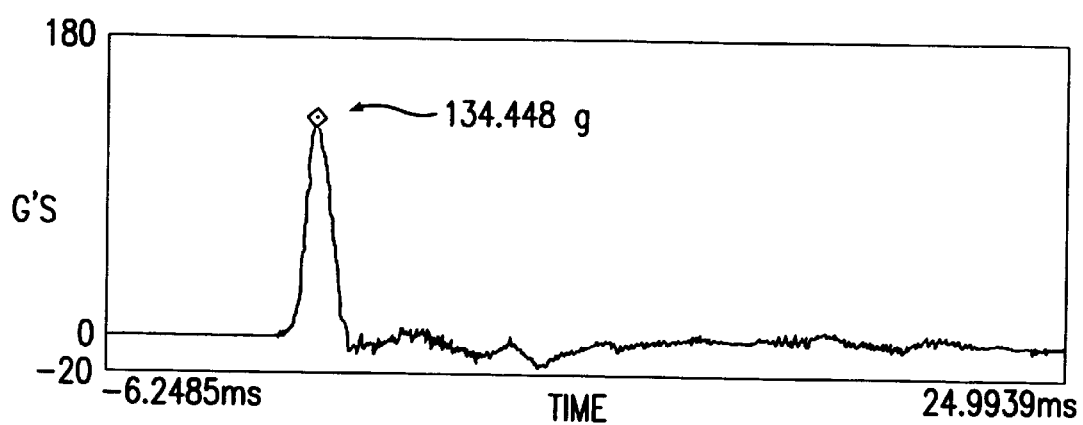
FIG. 6 is a graph showing the G acceleration over time measured at the disk drive in the enclosure of FIG. 5 due to a tilt drop of the enclosure (Prior Art).

FIG. 6 is a graph of a shock pulse measurement showing acceleration force amplitude and duration as detected on disk mechanism 145 of FIG. 5 during an actual tilt drop of enclosure 130. FIG. 6 depicts the shock pulse amplitude and duration that was detected by an accelerometer during a left side tilt drop of the enclosure. The accelerometer (not shown) was attached directly to disk mechanism 145 while it was disposed in the upper left bay of the enclosure. Similar to the previous example, the left side of the enclosure was lifted about 2.5 inches and then dropped.

As illustrated by FIG. 6, the peak G-force of the tilt drop of enclosure 130 measured about 134 Gs—slightly lower than that of the "no-bumps" enclosure of FIG. 3. FIG. 6 also depicts a similar duration to that of FIG. 4. The graph clearly shows that when enclosure 130 experiences a tilt drop with these non-strategically placed compliance bumps 135, the shock pulse transmits directly up the enclosure's vertical walls, producing, again, a fairly high-G/short-duration pulse. Although compliance bumps 135 did help attenuate the shock in this example a little bit (relative to the "no-bumps" example), the attenuation was not nearly that shown in reference to FIGS. 7 and 8 of the present invention.

Figure 7:
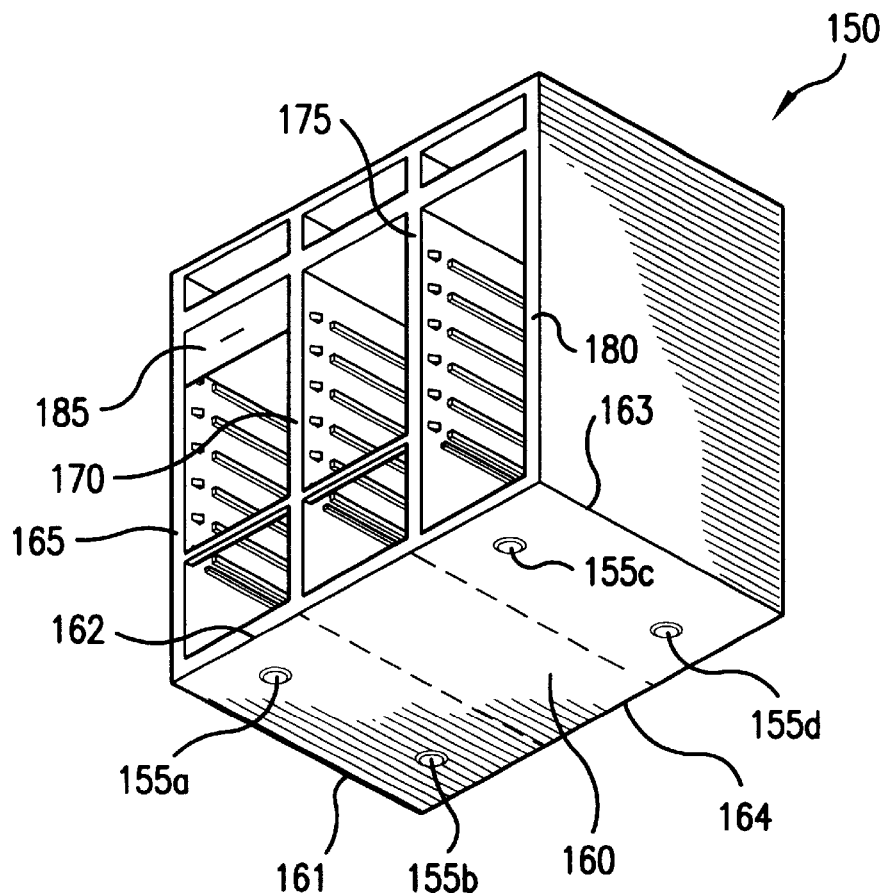
FIG. 7 is a bottom perspective view of an enclosure having four compliance bumps of the present invention.

Referring now to FIG. 7 and to illustrate the advantages of the present invention, a bottom perspective view shows an enclosure 150 having four compliance bumps 155 on base 160 according to principles of the present invention. Enclosure 150 is the same enclosure as (or very similar to) the enclosures of FIGS. 3 and 5 (i.e., is also of a metal construction), but includes the present invention strategically located compliance member (bumps) 155. Bumps 155a and 155b are disposed on base 160 generally in between vertical walls 165 and 170 of the enclosure, and bumps 155c and 155d are disposed on base 160 generally in between vertical walls 175 and 180. Each of the compliance bumps are disposed generally away from edges 161, 162, 163 and 164 of base 160 which are stiffly attached to the walls. Enclosure 150 also includes a single disk drive mechanism 185 mounted therein.

Figure 8:
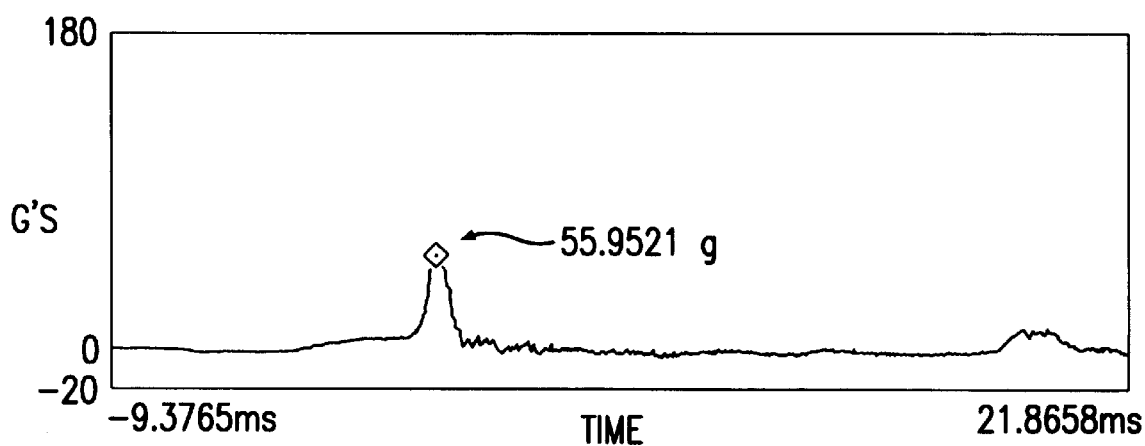
FIG. 8 is a graph showing the G acceleration over time measured at the disk drive in the enclosure of FIG. 7 due to a tilt drop of the enclosure.

In association with FIG. 7, the graph of FIG. 8 shows a shock pulse measurement of amplitude and duration as detected on disk mechanism 185 (of FIG. 7) during an actual tilt drop of enclosure 150. FIG. 8 depicts the shock pulse amplitude and duration that was detected by an accelerometer during a left side tilt drop of the enclosure. The accelerometer (not shown) was attached directly to disk mechanism 185 while it was disposed in the upper left bay of the enclosure. Similar to the previous examples, the left side of the enclosure was lifted about 2.5 inches and then dropped.

As illustrated by FIG. 8, the peak G-force of this tilt drop measured only about 56 Gs—substantially lower than that of the prior art "no-bumps" enclosure of FIG. 3 and that of the "non-strategically placed bumps" enclosure of FIG. 5. The duration of the shock pulse of FIG. 8 is similar to the prior art examples because of the rolling and damping which is inherently prevalent with enclosures of a sheet metal construction. The graphs of FIGS. 13 and 14 (discussed later herein) will show how the duration is increased under principles of the present invention for sample tilt drops of an enclosure that is molded (constructed) of plastic.

With bumps 155 in proper strategic location (i.e., generally between the walls, generally away from edges 161, 162, 163 and 164, and in a position so as to minimize the amplitude of a shock pulse entering the walls of the enclosure), it is seen from the graph of FIG. 8 that the gravitational force of the tilt drop measured less than one-half of either force measured with respect to FIG. 4 or FIG. 6. In essence, when the compliance bumps are added under the present invention, the enclosure has an enhanced, built-in spring effect which allows it to travel further during it's deceleration (i.e., during the fall from the tilt drop), thus causing the disk drive to see a lower-G shock pulse.

Figure 9:
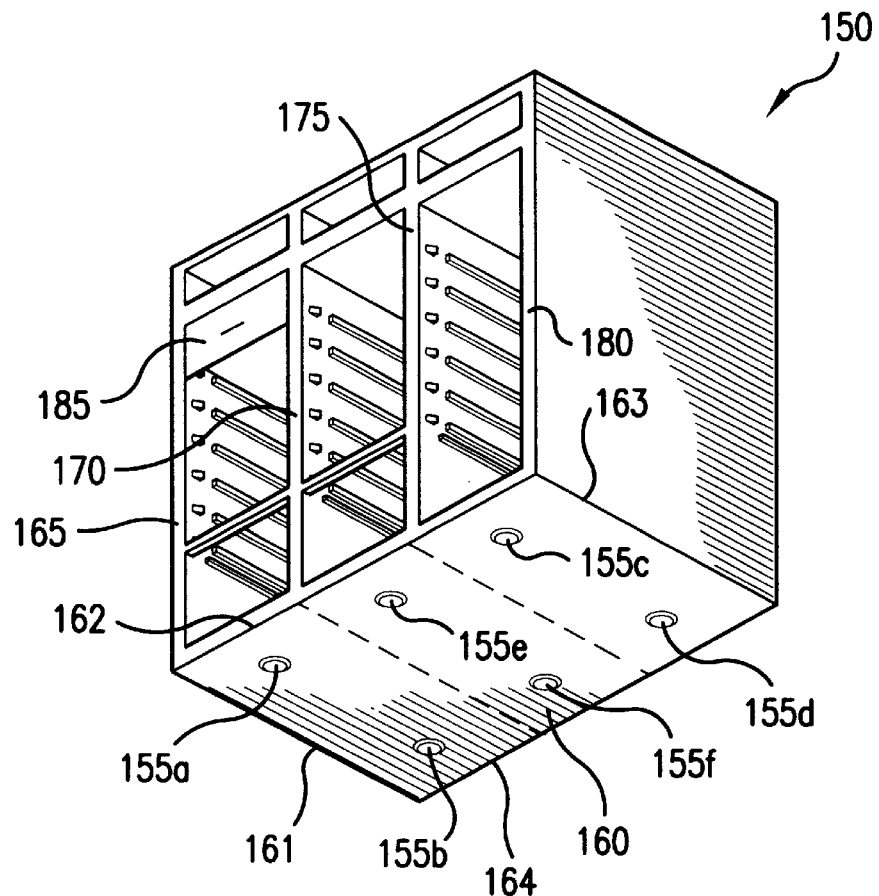
FIG. 9 is a bottom perspective view of an enclosure having six compliance bumps of the present invention.

To further illustrate the advantages of the present invention, FIG. 9 depicts a bottom perspective view of the same enclosure 150 of FIG. 7, only having six compliance bumps 155a, 155b, 155c, 155d, 155e and 155f on base 160 according to principles of the present invention. The extra two bumps were located generally between walls 170 and 175. Again, enclosure 150 of FIG. 9 is the same enclosure as (or very similar to) the enclosures of FIGS. 3, 5, and 7, and is also of a metal construction, but includes the variation of having six of the present invention strategically located bumps 155.

Figure 10:
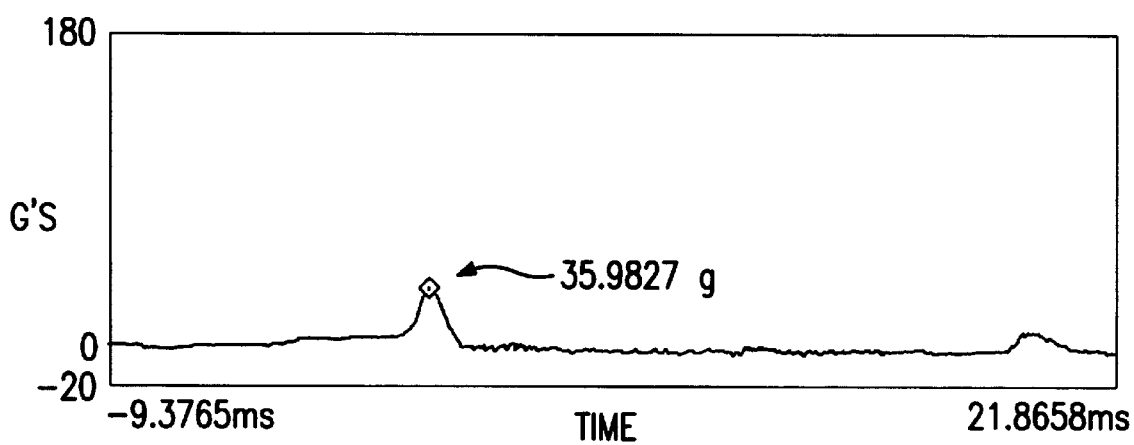
FIG. 10 is a graph showing the G acceleration over time measured at the disk drive in the enclosure of FIG. 9 due to a tilt drop of the enclosure.

In association with FIG. 9, the graph of FIG. 10 shows a shock pulse measurement of amplitude and duration as detected on disk mechanism 185 (of FIG. 9) during an actual tilt drop of enclosure 150. As clearly shown in FIG. 10, the amplitude of about 36 Gs of the gravitational force of the tilt drop for the enclosure of FIG. 9 measured significantly less than either force measured with respect to FIG. 4 or FIG. 6, thus further demonstrating the advantages of the present invention over the art.

Figure 11:
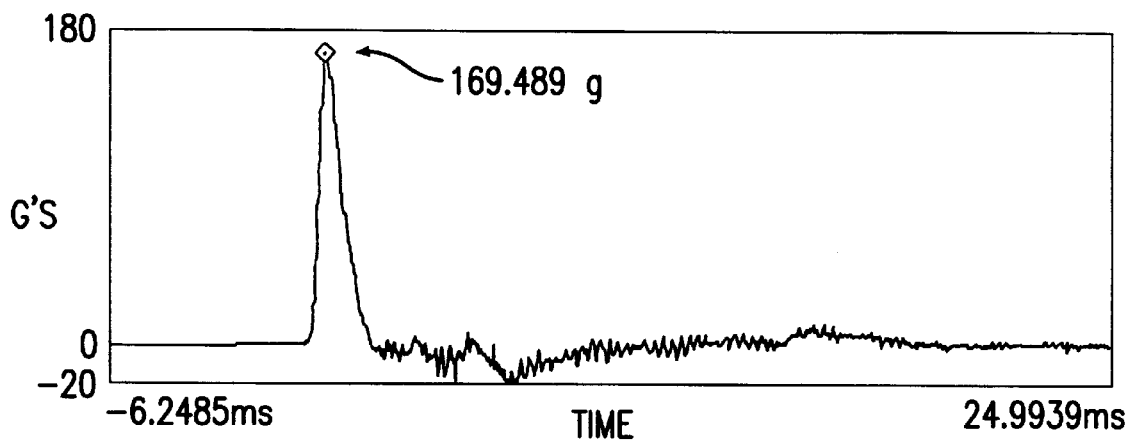
FIGS. 11–12 are further graphs showing the G acceleration over time for tilt drops of alternate embodiments of the enclosures of FIGS. 3 and 5 (Prior Art).
Figure 12:
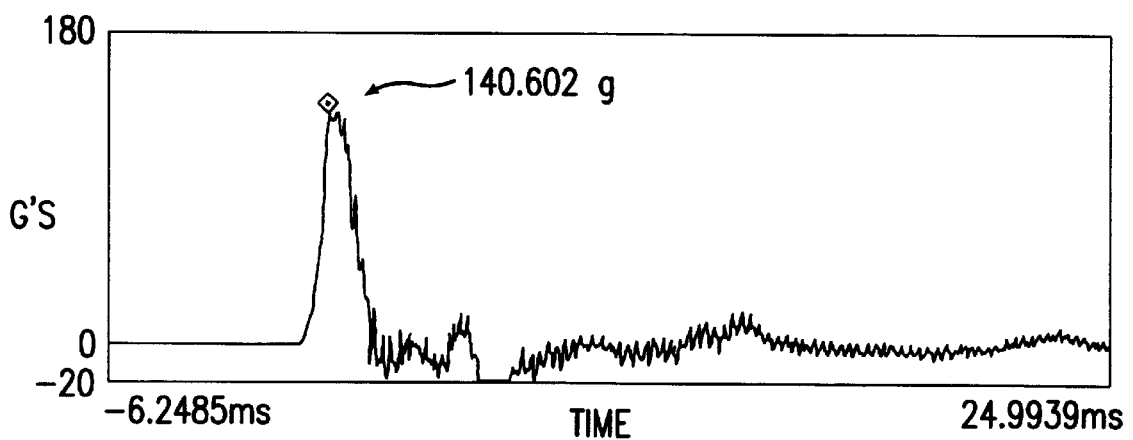

Referring now to FIGS. 11–12, these graphs show the G acceleration and pulse duration measurements over time for conventional enclosures similar to those of FIGS. 3 and 5, but the enclosures used to obtain the graph results of FIGS. 11–12 were molded from plastic rather than constructed of sheet metal. FIGS. 11–12 are shown to clearly compare the art with the present invention compliance bumps as described in reference to FIGS. 13–14 (in the context of plastic molded enclosures).

For example, FIG. 11 graphs the amplitude and duration for a tilt drop of an enclosure similar to that of FIG. 3 and having no compliance bumps, but molded of plastic rather than constructed of sheet metal. As seen from the graph of FIG. 11, the amplitude of the shock pulse for the plastic enclosure without compliance bumps measured about 169 G's.

FIG. 12 graphs the amplitude and duration for a tilt drop of an enclosure similar to that of FIG. 5, having eight compliance bumps not strategically located thereon, but constructed of plastic rather than sheet metal. As seen, the amplitude of the shock pulse for the plastic enclosure having eight non-strategically located compliance bumps measured about 140 G's.

Figure 13:
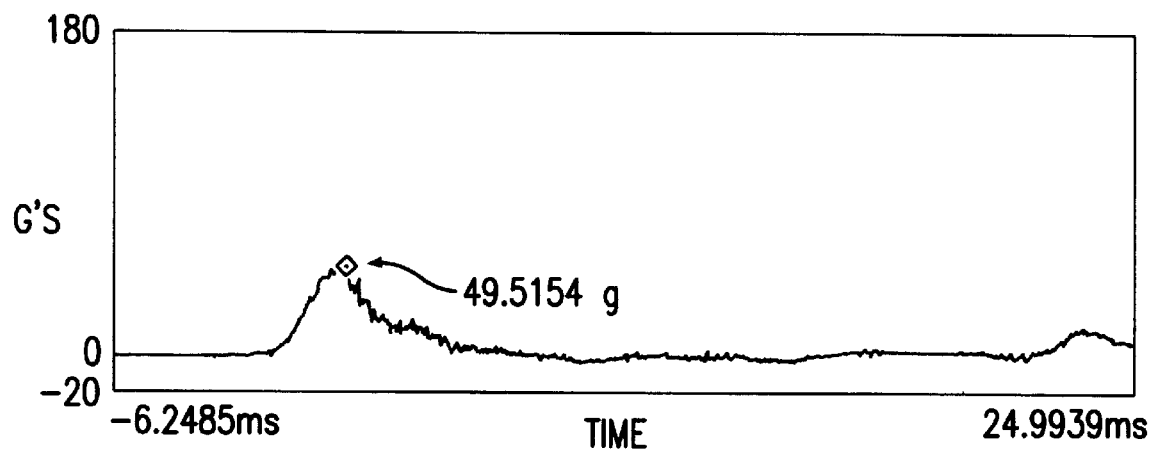
FIGS. 13–14 are further graphs showing the G acceleration over time for tilt drops of alternate embodiments of the enclosures of FIGS. 7 and 9 and employing the compliance bumps of the present invention.
Figure 14:
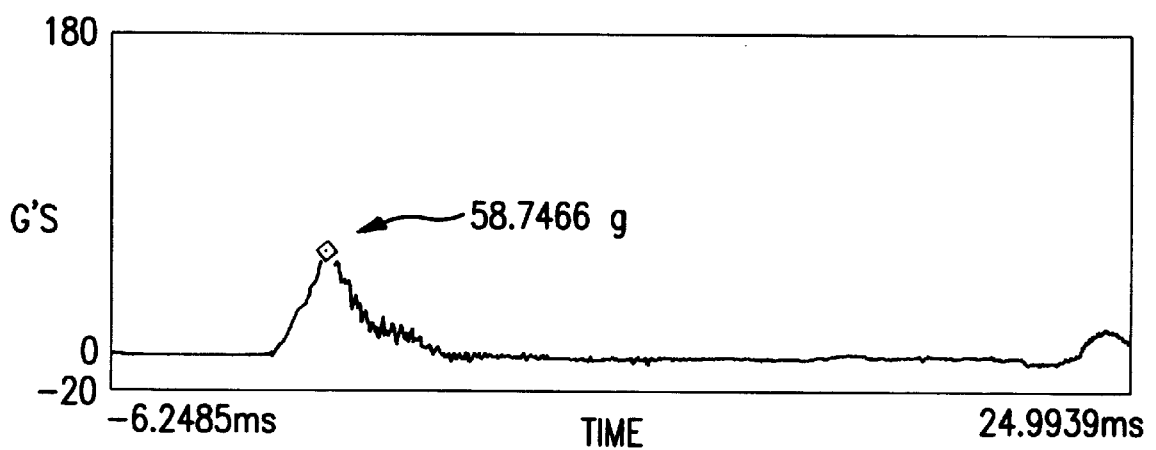

Referring now to FIGS. 13–14, these graphs show the G acceleration and pulse duration measurements over time for enclosures similar to those of FIGS. 7 and 9 and employing compliance bumps of the present invention, but the enclosures used to obtain the graph results of FIGS. 13–14 were molded from plastic rather than constructed of sheet metal.

FIG. 13 graphs the amplitude and duration for a tilt drop of an enclosure similar to that of FIG. 7, having four compliance bumps of the present invention, but the enclosure producing the results is molded from plastic rather than constructed of sheet metal. As seen, the amplitude of the shock pulse for the plastic enclosure having four compliance bumps measured about 49 G's, which was significantly lower than that measured in FIG. 11 for a plastic enclosure having no compliance bumps. In addition, the duration of the shock pulse is significantly increased in FIG. 13 relative to all previous exemplary durations, thus lowering the fundamental frequency of the shock pulse. This illustrates a significant advantage of the present invention compliance bumps because it shows how the frequency content of the shock pulse can be shifted to be lower than the internal resonances of the disk drives.

Finally, FIG. 14 graphs the amplitude and duration for a tilt drop of an enclosure also similar to that of FIG. 9, having six compliance bumps of the present invention, but the enclosure producing the results is molded of plastic rather than constructed of sheet metal. As seen, the amplitude of the shock pulse for the plastic enclosure having six compliance bumps measured about 59 G's, which was also lower than any of the examples not employing the present invention compliance bumps. Similar to FIG. 13, the duration of the shock pulse is significantly increased due to the plastic molded construction, again lowering the fundamental frequency of the shock pulse.

What has been described above are the preferred embodiments for an enclosure having strategically placed compliance members for attenuating shock pulse amplitudes to mechanisms in the enclosure. It will be obvious to one of ordinary skill in the art that the present invention is easily implemented utilizing any of a variety of components existing in the art. Moreover, while the present invention has been described by reference to specific embodiments, it will be apparent that other alternative embodiments and methods of implementation or modification may be employed without departing from the true spirit and scope of the invention.

What is claimed is:

1. An mass storage mechanism enclosure for holding shock sensitive mass storage mechanisms, the enclosure comprising:

(a) a bottom support member;

(b) at least two wall structures stiffly coupled to the bottom support member at spaced locations thereon, and wherein the at least two wall structures are configured for supporting the shock sensitive mass storage mechanisms therebetween; and, (c) shock feet associated with the bottom support member for contacting a support surface upon which the enclosure is set or rests, and wherein the shock feet are positioned at generally equidistant locations between any two nearest wall structures.

2. The enclosure of claim 1 wherein the shock feet are molded into or formed onto the bottom support member as part of the bottom support member.

3. The enclosure of claim 1 wherein the shock feet are bumps on the bottom support member.

4. The enclosure of claim 1 wherein the shock sensitive mechanisms are disk drive mechanisms held within the enclosure by way of the wall structures.

5. A mass storage mechanism housing for supporting a plurality of disk drive mechanisms, comprising:

(a) bottom and top support members;

(b) first, second and third wall structures coupled to the bottom and top support members, and wherein the first and second wall structures are configured for supporting therebetween a first subset of the plurality of disk drive mechanisms, and the second and third wall structures are configured for supporting therebetween a second subset of the plurality of disk drive mechanisms; and, (c) compliance bumps disposed on the bottom support member for contacting a support surface upon which the housing rests, and wherein a first subset of the compliance bumps are positioned on the bottom support member at generally equidistant locations between the first and second wall structures, and wherein a second subset of the compliance bumps are positioned on the bottom support member at generally equidistant locations between the second and third wall structures.

* * * * *